United States Patent [19]

Kulig

[11] Patent Number: 4,717,412
[45] Date of Patent: Jan. 5, 1988

[54] STATIONARY TUBE HOLDER AND REVOLVING ROTOR ASSEMBY FOR A GLASS SPOUT BOWL

[75] Inventor: Constantine W. Kulig, Windsor, Conn.

[73] Assignee: Emhart Industries, Inc., Farmington, Conn.

[21] Appl. No.: 939,399

[22] Filed: Dec. 8, 1986

[51] Int. Cl.⁴ .............................................. C03B 7/08
[52] U.S. Cl. ........................................ 65/327; 65/129; 65/330
[58] Field of Search ................. 65/325, 330, 331, 327, 65/129

[56] References Cited

U.S. PATENT DOCUMENTS

| | | | |
|---|---|---|---|
| 1,844,847 | 2/1932 | Good | 65/330 |
| 2,470,558 | 5/1949 | Honiss | 65/129 |
| 2,707,354 | 5/1955 | Peiler | 65/330 |
| 2,969,614 | 1/1961 | Stewart | 65/327 X |
| 3,239,326 | 3/1966 | Tyner | 65/330 |
| 4,551,163 | 11/1985 | Duga et al. | 65/129 |
| 4,581,055 | 4/1986 | Bratton | 65/330 X |

*Primary Examiner*—Arthur Kellogg
*Attorney, Agent, or Firm*—Spencer T. Smith

[57] ABSTRACT

A stationary tube holder and revolving rotor assembly which is to be used in conjunction with a glass spout bowl. The assembly includes a stationary tube holder assembly which has elongated horizontally extending arm for supporting a tube at one end and a counterweight at the other, a revolving rotor assembly which has an elongated horizontally extending arm for supporting a rotor at one end and a counterweight at the other, and a compound X, Y, slide assembly.

A vertical spacer is secured between the compound X, Y slide assembly and the elongated tube holder assembly arm for supporting the stationary tube holder assembly. The spacer includes a jack screw for elevating the tube holder assembly relative to the compound X, Y slide assembly.

A vertical post is secured at its bottom end to the compound X, Y slide assembly, and at its top slidingly extends through an extended bushing in the stationary tube holder assembly arm. The post additionally is interconnected with this rotor assembly and can raise or lower this assembly.

2 Claims, 6 Drawing Figures

FIG. 2
FIG. 5
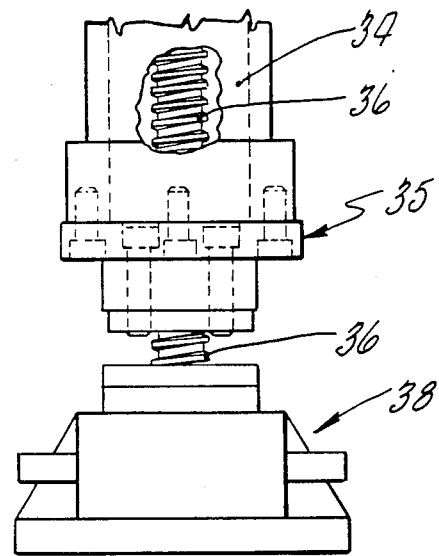
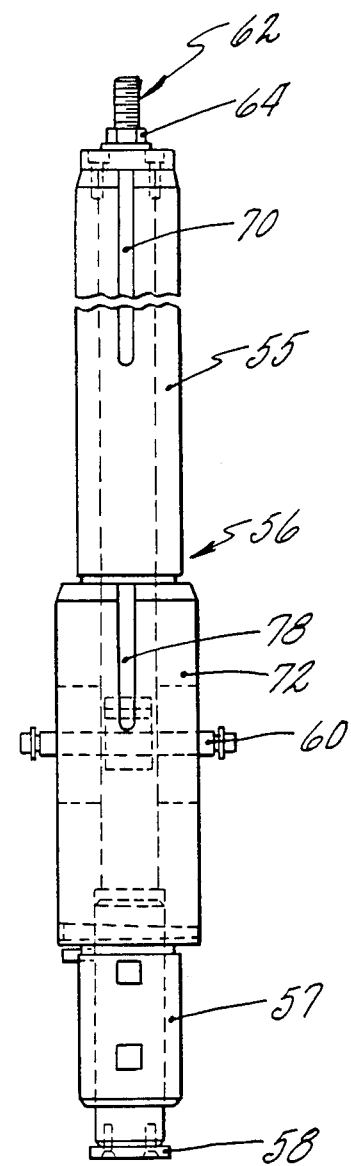

STATIONARY TUBE HOLDER AND REVOLVING ROTOR ASSEMBY FOR A GLASS SPOUT BOWL

The present invention relates to glass spout bowls utilized in the manufacture of glass.

Movement of the molten glass contained by a spout bowl is conventionally achieved by either rotating a tube within the inner wall of the spout bowl or by holding the tube stationary while rotating rotors located within the molten glass. The latter approach may result in better gob weight control.

In prior designs where the tube is stationary, the stationary tube arm is mounted on one side of the spout and the rotor assembly arm is mounted on the other side. Each assembly is separately adjusted to establish concentricity between the tube and rotors to the orifice ring. When the spout is unheated, the separate assemblies are not overly difficult to align. At startup, all assemblies are heated up to working temperatures and all three elements are then substantially out of concentricity. Since the rotor assembly and tube assembly are mounted on opposite ends, the misalignment of rotor to tube is the sum of the thermal expansion of each individual assembly. Adjustments must be then made to reestablish the desired concentricity. The adjustment for the rotor being in a cool area is not difficult to make, but tube adjustment is more difficult. To adjust the tube, an eccentric, located in a very hot area, needs to be adjusted.

It is accordingly an object of the present invention to provide rotor and stationary tube assemblies which do not require any adjustment during operation to maintain their concentricity.

Another object is to simultaneously adjust the axis of the stationary tube and rotors.

A further object is to mount the adjustment structure for these assemblies in a generally cooler area for easy and precise adjustment of tube and rotors to the orifice ring.

Other objects and advantages of the present invention will become apparent from the following portion of this specification and from the accompanying drawings which illustrate in accordance with the mandate of the patent statutes a presently preferred embodiment incorporating the principles of the invention.

Referring to the drawings:

FIG. 2 is an enlarged view of a portion of the tube and rotor assembly illustrated in FIG. 1;

FIG. 5 is an elevated view of the post assembly; and

Figure 1:
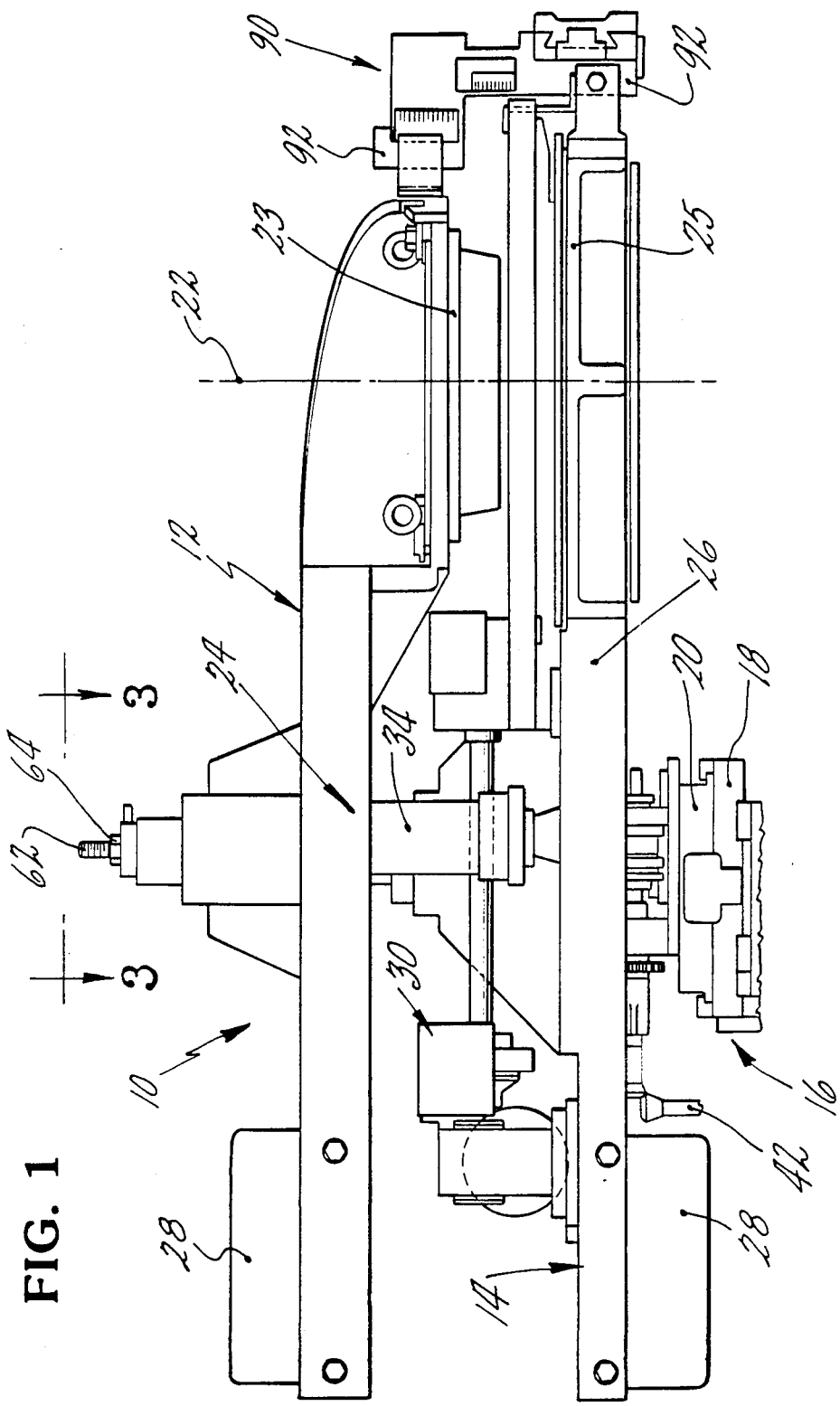
FIG. 1 is a front view of the stationary tube and revolving rotor assembly of a glass spout bowl made in accordance with the teachings of the present invention.

A tube and rotor assembly 10 of a glass spout bowl (not shown) includes a stationary tube holder assembly 12 and a rotor holder mechanism 14, both of which are supported independently on a compound X, Y slide 16. The compound slide 16 includes manually clampable X (18) and Y (20) slides which can be adjusted to precisely locate the coaxial axes 22 of the tube supporting frame 23 of the stationary tube holder assembly arm 24 and the rotor supporting frame 25 of the rotor holder assembly arm 26 in coaxial relation with the axis of the glass spout bowl (not shown).

The stationary tube holder assembly 12 and the rotor holder mechanism 14 have suitable counterweights 28, and the rotor holder mechanism 14 additionally includes a conventional drive assembly 30 which keeps the revolving rotors (not shown) in motion in the molten glass contained within the glass spout bowl (not shown).

Secured by screws 33 to and supporting the arm 24 of the stationary tube holder assembly 12 is a spacer 34 to which an adapter 35 is secured which receives the jack screw 36 of a jack screw assembly 38 (FIG. 2) mounted on the compound slide. Rotation of the height adjusting member 42 (FIG. 1) raises or lowers the stationary tube holder assembly 12.

Figure 4:
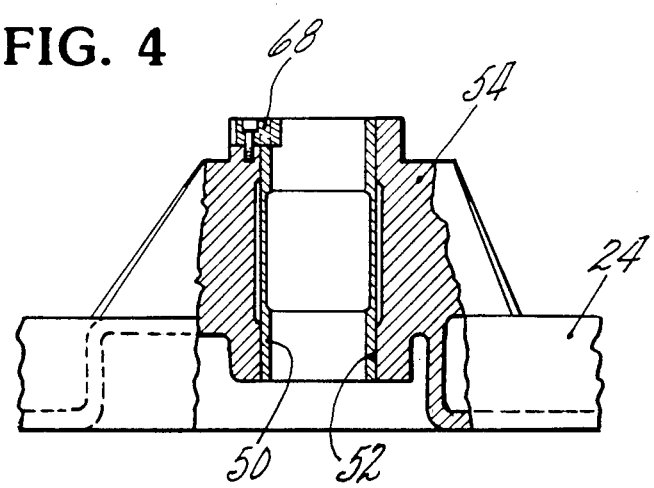
FIG. 4 is a view taken at the lines 4—4 of FIG. 3 with the post assembly removed.

Extending through a bushing 50 (FIG. 4) in a through hole 52 defined in a support casting 54, which is mounted on the stationary tube holder assembly arm, is the post 55 of an elevating post assembly 56 (FIG. 5). The post assembly 56 which has a size sufficient to prevent its bowing under the load of the stationary tube holder assembly and the bushing 50 which has an extended length, assure that the desired horizontal position of the tube holder assembly arm 24 will be maintained. This will accordingly prevent the bowing of the jack screw 36 thereby assuring the easy operation of the jack screw assembly 38.

Figure 3:
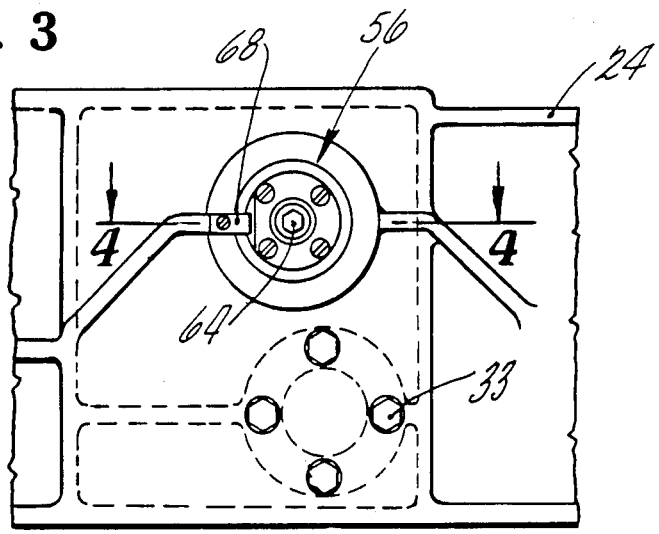
FIG. 3 is a view taken at lines 3—3 of FIG. 1.
Figure 6:
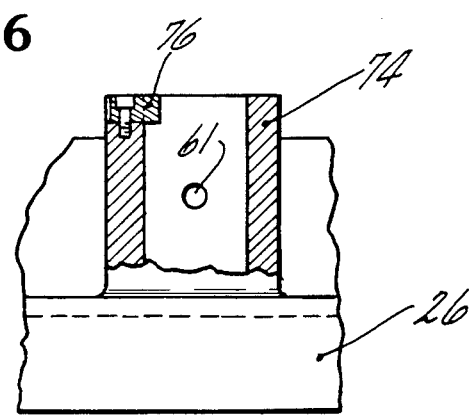
FIG. 6 is a view similar to FIG. 4 of a portion of the rotor assembly illustrated in FIG. 1.

The post assembly 56 is secured at its bottom end to a bracket 58 and to a sturdy bracket (not shown) which is firmly attached to the post at position 57 and to the same slide bracket. The enlarged section 72 of the post assembly is matingly received within a mounting cyinder 74 on the rotor arm (FIG. 6) and interconnection is achieved by insertion of the Clevis pin 60 of the adjusting rod assembly 62 into suitable bores 61 defined in the mounting cylinder. Rotation of the flanged nut 64 raises or lowers the rotor holder mechanism. Independently raising or lowering the tube holder assembly 14 effects a displacement of the bushing 50 and the integral tube holder assembly 12 upwardly or downwardly relative to the post 55 of the post assembly 56. To maintain the desired orientation of the post 55 within the bushing 50 and tube holder assembly 12, a key 68 (FIGS. 3 and 4) secured to the support member 54 is located within an axial slot 70 in the post 55. Similarly, a key 76 (FIG. 6) secured to the support member 26 is located within axial slot 78 in the post 55.

Precise orientation of the stationary tube holder assembly 12 and the rotor mechanism 14 is achieved with the use of a clamp assembly 90 which locates these assemblies against locating surfaces 92.

I claim:

1. A stationary tube holder and revolving rotor assembly for use in conjunction with a glass spout bowl comprising:
   a stationary tube holder assembly including an elongated horizontally extending arm for supporting a tube at one end and a counterweight at the other end,
   a revolving rotor assembly including an elongated horizontally extending arm for supporting a rotor at one end and a counterweight at the other,
   a compound X, Y, slide assembly for horizontally displacing structure secured thereto in the X or Y direction,
   vertical spacer means secured between said compound X, Y slide assembly and said elongated tube holder assembly arm for supporting said stationary tube holder assembly, said spacer means including a jack screw assembly having a vertical jack screw for elevating said tube holder assembly relative to said compound X, Y slide assembly, vertical post means secured at its bottom end to said compound X, Y slide assembly, and said stationary tube holder assembly arm including a support casting having a hole with an extended bushing therein for receiving a portion of said post means, said post means additionally including means for elevating said revolving rotor assembly.

2. A stationary tube holder and revolving rotor assembly according to claim 1, wherein said elevating means comprises an adjusting rod assembly including a clevis pin for interconnecting with said revolving rotor assembly, and a flanged nut adapted to be rotated for raising or lowering said clevis pin.

* * * * *